United States Patent [19]

Saito

[11] Patent Number: 5,295,618

[45] Date of Patent: Mar. 22, 1994

[54] TAPE GUIDE DEVICE HAVING VIBRATOR WITH FREE END PORTION

[75] Inventor: Etsuro Saito, Tokyo, Japan

[73] Assignee: Sony Corporation, Tokyo, Japan

[21] Appl. No.: 20,026

[22] Filed: Feb. 18, 1993

Related U.S. Application Data

[63] Continuation of Ser. No. 687,512, Apr. 19, 1991, abandoned.

[30] Foreign Application Priority Data

Apr. 19, 1990 [JP] Japan .................................. 2-103627

[51] Int. Cl.$^5$ ............................................. B65H 27/00
[52] U.S. Cl. .................................... 226/196; 226/194; 242/76
[58] Field of Search ........................ 226/190, 196, 194; 242/76; 384/1, 276, 280, 296, 295, 277, 278, 317

[56] References Cited

U.S. PATENT DOCUMENTS

| 3,037,828 | 4/1962 | Michael | 384/278 |
| 3,084,003 | 4/1963 | Matt et al. | 384/278 |
| 3,129,484 | 4/1964 | Houston, Jr. | 384/776 X |
| 3,608,927 | 9/1971 | Grosseau | 384/276 X |
| 3,949,919 | 4/1976 | Takei | 226/194 |
| 4,790,672 | 12/1988 | Komplin | 384/296 X |
| 4,850,719 | 7/1989 | Moseley | 384/1 |
| 4,875,610 | 10/1989 | Kitamoto et al. | 226/10 |

FOREIGN PATENT DOCUMENTS 0386712 9/1990 European Pat. Off. .
1094067 5/1984 U.S.S.R. .

Primary Examiner—Daniel P. Stodola
Assistant Examiner—Paul T. Bowen
Attorney, Agent, or Firm—Lewis H. Eslinger; Jay H. Maioli

[57] ABSTRACT

A tape guide device comprising a pipe-shaped guide member for guiding a tape, an ultrasonic vibrator for vibrating the guide member by standing waves, and a support member for holding the guide member, wherein one end of the ultrasonic vibrator is kept free while the other end thereof is attached fixedly to a vibrational loop on the peripheral surface of the guide member, and vibrational nodes of the guide member are held by the support member, hence stabilizing the characteristic of standing-wave vibration.

11 Claims, 9 Drawing Sheets

TAPE GUIDE DEVICE HAVING VIBRATOR WITH FREE END PORTION

This is a continuation of application Ser. No. 07/687,512, filed Apr. 19, 1991, now abandoned.

BACKGROUND OF THE INVENTION

1. Field of the Invention

The present invention relates to a tape guide device adapted for use in a video tape recorder or the like and, more particularly, to a device where ultrasonic vibration is utilized to reduce the friction in contact with a tape.

2. Description of the Prior Art

There are known conventional tape guide devices inclusive of an example filed by the present applicant and disclosed in Japanese Patent Application No. Hei 1 (1989)-53287. As shown in FIG. 11, such known tape guide device 1 comprises a mount member 8, a pair of support shafts 7 fixed therein, a guide member 2 which is held by fore ends of the support shafts fitted into lateral portions thereof and serves to guide a tape wound therearound over a predetermined angle, and a laminated piezoelectric element 3 serving as an ultrasonic vibrator and bonded at one end to the guide member 2 while being bonded at the other end to the mount member 8. The guide member 2 is vibrated by standing waves from the laminated piezoelectric element 3 so as to diminish the resistance that is caused by agglutination derived from the intermolecular attraction and the interatomic attraction on the contact surfaces of the tape and the guide member 2 and also by thrust and upturn of the irregularities on such contact surfaces, hence reducing the frictional force.

FIG. 12 shows another conventional tape guide device proposed by the present applicant and disclosed in Japanese Patent Application No. Hei 1 (1989)-58449. The tape guide device of FIG. 12 is structurally similar to the aforementioned conventional example with the exception that a recess 2a is formed in a portion of the guide member 2, and both ends of the laminated piezoelectric element 3 are anchored firmly in such recess 2a.

However, in the former conventional example of FIG. 11, the respective thermal expansion coefficients of the support shaft 7 and the laminated piezoelectric element 3 are mutually different, so that there arises a problem of lowering the positional precision relative to the guide member 2. Furthermore, since one end of the laminated piezoelectric element 3 is fixedly attached to the guide member 2 as mentioned, the standing-wave frequency characteristic is harmfully affected by the vibrations of the mount member 8 and the support shafts 7 to be thereby complicated, hence rendering the resonance control difficult and lowering the vibration efficiency.

In addition, as the standing waves generated in the guide member 2 are affected by the mount member 8 and the support shafts 7, the partial standing waves thus affected are distorted to consequently fail in attaining complete reduction of the friction to the tape. Besides the above, the friction of the guide member is rendered partially nonuniform to eventually bring about a failure in stabilizing the motion of the tape.

Meanwhile in the latter conventional example of FIG. 12 where a recess 2a is formed in a portion of the guide member 2, both ends of the laminated piezoelectric element 3 are anchored firmly in such recess 2a, so that the harmful influence of vibration to other members can be reduced. However, since the guide member 2 is formed into an uncommon shape, it is extremely difficult to derive the resonance characteristic of the guide member 2, and the waveform of the standing waves is complicated similarly to the foregoing conventional example, hence raising the same problem. In addition, there also exist other problems inclusive of increased production cost that results from requirements of high precision relative to the component parts and the assembling with the process of cutting the recess 2a and so forth.

Furthermore, thermal expansion of the laminated piezoelectric element 3 is caused by the heat generated during the operation and therefore the surface secured to the recess 2a is pressed to consequently distort the guide member 2, hence failing in complete reduction of the friction while inducing harmful influence on the motion of the tape.

OBJECTS AND SUMMARY OF THE INVENTION

It is an object of the present invention to provide a tape guide device capable of deriving the resonance characteristic of a guide member with remarkable facility.

Another object of the present invention resides in providing a tape guide device where standing waves generated in a guide member have a simple and orderly waveform without including any unrequired vibration component.

A further object of the invention is to provide a tape guide device comprising a guide member resonant with a high Q factor.

An even further object of the invention is to provide a tape guide device where standing waves of a great amplitude can be generated efficiently in a guide member.

A still further object of the invention is to provide a tape guide device where thermal expansion of a laminated piezoelectric element serving as a vibrator can be kept free from exerting harmful influence on other component parts.

Another object of the invention resides in providing a tape guide device where a driving mechanism for imparting vibration to a guide member has a remarkably simplified structure.

Yet another object of the invention is to provide a tape guide device where standing waves generated in a guide member are not affected harmfully by a support mechanism for the guide member.

A further object of the invention is to provide a tape guide device where the friction between a guide member and a tape is markedly reduced as compared with that in any conventional device.

An even further object of the invention is to provide a tape guide device capable of retaining high stability in the motion of a tape.

And a still further object of the invention is to provide a tape guide device of an extremely simplified structure as a whole which can be assembled with ease.

For the purpose of achieving the objects mentioned, the tape guide device of the present invention comprises a pipe-shaped guide member for guiding a tape, an ultrasonic vibrator for vibrating the guide member by standing waves, and a support member for holding the guide member, wherein one end of the ultrasonic vibrator is kept free while the other end thereof is attached fixedly to a vibrational loop on the peripheral surface of the guide member, and a vibrational node of the guide member is held by the support member, thereby stabilizing the characteristic of standing-wave vibration.

The above and other features and advantages of the present invention will become apparent from the following description which will be given with reference to the illustrative accompanying drawings.

BRIEF DESCRIPTION OF THE DRAWINGS

FIGS. 1 through 6 show a first embodiment of the present invention, in which FIG. 1 is a sectional view of the tape guide device;

FIG. 2 is an exploded perspective view of the tape guide device;

FIG. 3 is a perspective view illustrating how the tape guide device is mounted on a base;

FIG. 4 is a function explanatory diagram of standing waves generated in the guide member of FIG. 2 and developed in the direction of an arrow along the line IV—IV;

FIG. 5 is a function explanatory diagram of the standing waves generated at the end face of the guide member; and FIG. 6 is a function explanatory diagram taken along the line VI—VI in FIG. 2 with the laminated piezoelectric element ignored;

FIGS. 7 and 8 show a second embodiment of the present invention, in which FIG. 7 is a sectional view of the tape guide device; and FIG. 8 is a plan view of FIG. 7;

DESCRIPTION OF THE PREFERRED EMBODIMENTS

Hereinafter a first embodiment of the present invention will be described in detail with reference to FIGS. 1 through 6.

Figure 1:
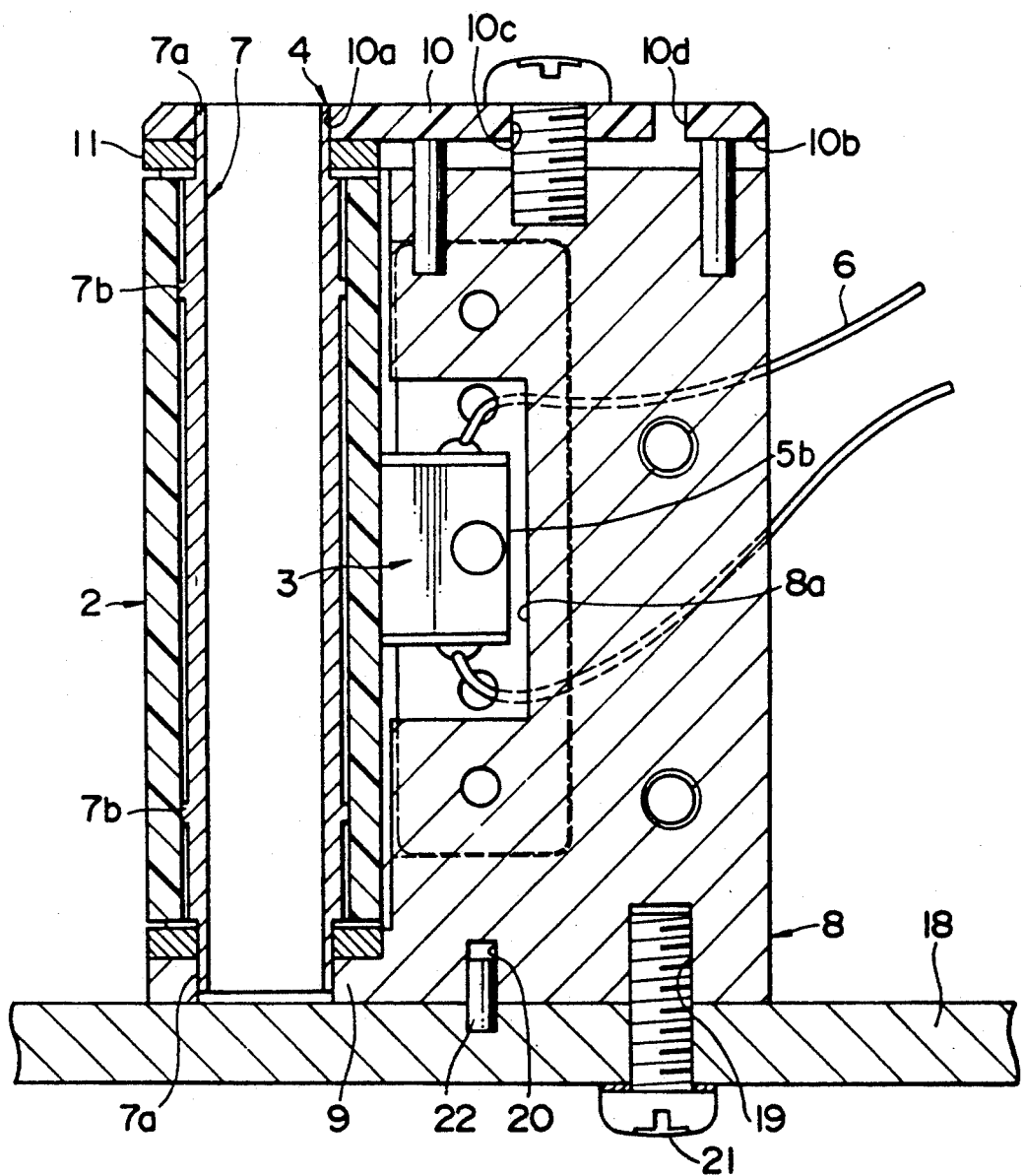
Figure 2:
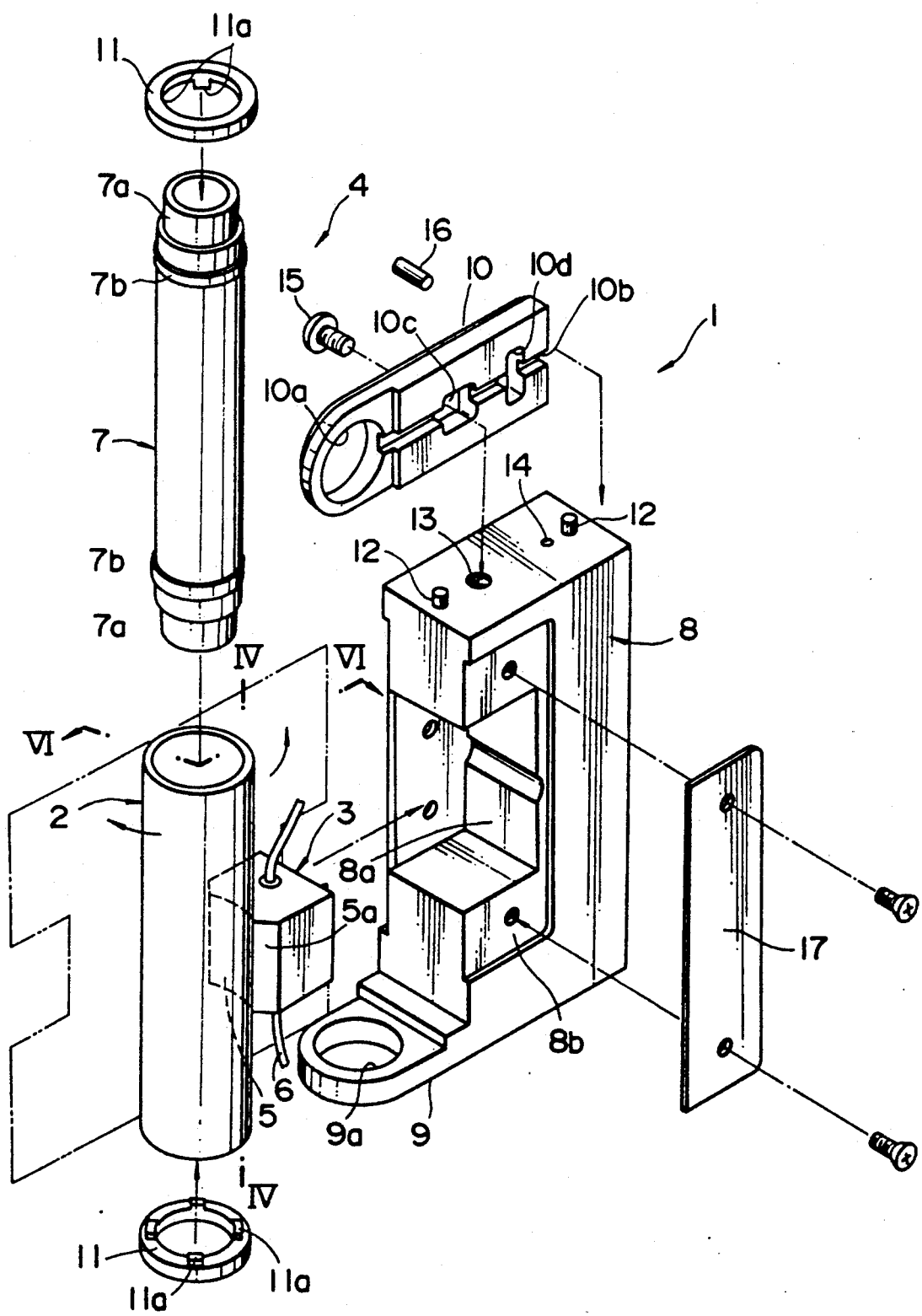
Figure 3:
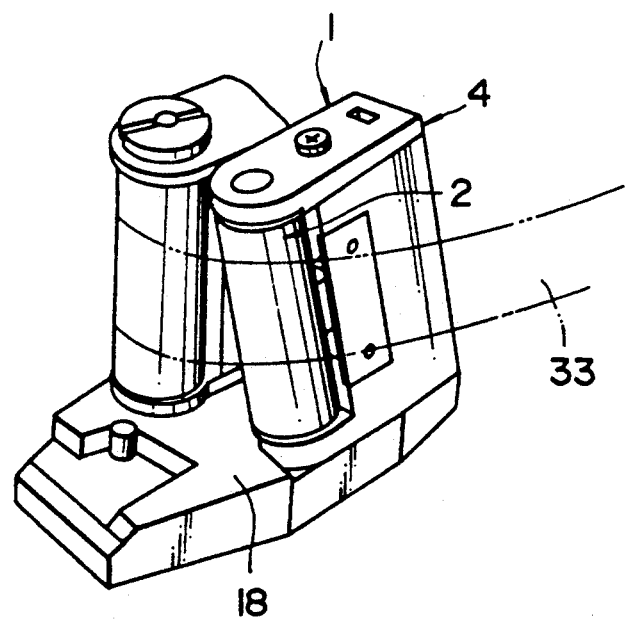

In FIGS. 1-3, a tape guide device 1 comprises a guide member 2 for guiding a tape, an ultrasonic vibrator 3 for vibrating the guide member 2 by standing waves, and a support member 4 for holding the guide member 2.

Figure 6:
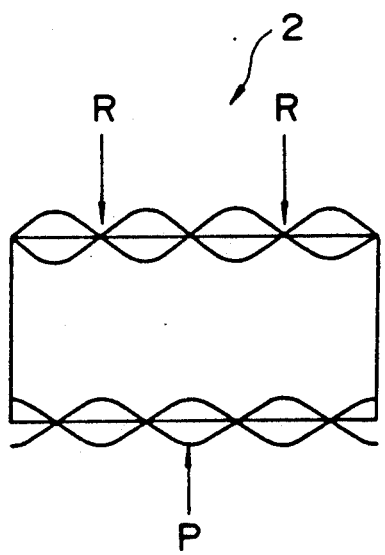

The guide member 2 is composed of a metallic or ceramic material and is shaped into a pipe as illustrated in FIGS. 1 and 2. On the peripheral surface of the guide member 2, as illustrated in FIG. 6, one end face of a laminated piezoelectric element 3 serving as the aforementioned ultrasonic vibrator is attached firmly with a bonding agent to a portion corresponding to a loop R of the guide member 2 vibrated by standing waves. The laminated piezoelectric vibrator 3 is freestanding; in other words, the other end 5b of such laminated piezoelectric element 3 is kept free. The laminated piezoelectric element 3 may be attached to any portion of the guide member 2 if it is a vibrational loop in a driving system, but the highest vibration efficiency is achieved in attachment to the center of the loop P.

The bonding agent needs to have adequate properties inclusive of sufficient thermal resistance against the heat generated in the laminated piezoelectric element 2 during the operation thereof, and must be free from being softened or deteriorated when heated to high temperature. It is further desired that the bonding agent has a high hardness and is suited to form a thin layer thereof so as to enhance the efficiency in imparting the vibration to the guide member 2.

One end face (bondable face) 5 of the laminated piezoelectric element 3 is shaped with a curve corresponding to the peripheral surface of the guide member 2, and cut corners 5a are formed at both ends of the bondable face 5 in a manner to avoid contact with the guide member 2. Since any excessively wide bondable face 5 of the laminated piezoelectric element 3 impairs the uniform shape of the guide member 2 and exerts harmful influence on the frequency characteristics thereof, the cut corners 5a are formed for minimizing the bondable face 5 and still maintaining a great output of the laminated piezoelectric element 3. Leadwires 6 are connected to two terminals on both sides of the laminated piezoelectric element 3 while being connected to an unshown alternating current source.

The aforementioned support member 4 has a support shaft 7 inserted into the guide member 2 and also a mount member 8 with upper and lower flanges 9, 10 for holding the support shaft 7 and both ends of the guide member 2.

Figure 5:
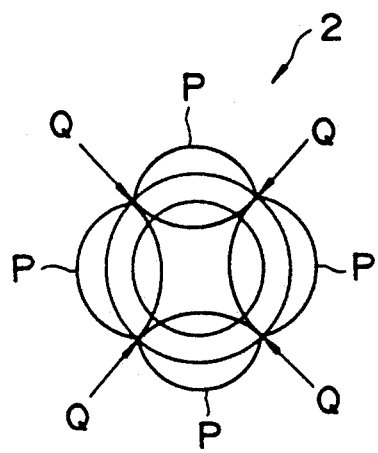

The support shaft 7 is shaped to be cylindrical and is inserted into the guide member 2. Both ends of the support shaft 7 are shaped to be slightly smaller in diameter through stepped portions and are fitted into shaft fit openings 9a, 10a formed respectively in the upper and lower flanges 9, 10 of the mount member 8. A washer 11 is interposed between each of the upper and lower flanges 9, 10 and the end face of the guide member 2. And four support projections 11a are provided at circumferential positions corresponding to vibrational nodes on one surface of the washer 11 opposed to the guide member 2. As illustrated in FIG. 5, the support projections 11a serve to hold vibrational nodes Q generated on both end faces of the guide member 2 when it is vibrated by standing waves. The washer 11 may be shaped into a flat plate instead of the above structure with the support projections 11a. Such modification serves to prevent disorder of the standing waves that may otherwise be induced by forced contact of the washer 11 with the end face of the guide member 2.

On the partial peripheral surface of the support shaft 7 proximate to its two ends, there are formed, as illustrated in FIG. 2, support ridges 7b circumferentially at positions corresponding to vibrational nodes R which are generated when the guide member 2 is vibrated by standing waves. And the vibrational nodes R of the guide member 2 are supported by the ridges 7b as illustrated in FIG. 1.

The mount member 8 is composed of a metallic material or the like and is shaped to be substantially rectangular as illustrated in FIG. 2. And an element housing portion 8a is formed on one side of the mount member 8 so as to house the laminated piezoelectric element 3 therein. The aforementioned lower flange 9 is formed integrally with the lower end of the mount member 8, while the upper flange 10 of a plastic material is attached fixedly to the upper end thereof.

A pair of guide pins 12 are fixed upright at the upper end face of the mount member 8, and a mount screw hole 13 and a tilt adjust hole 14 are formed between such guide pins 12. Meanwhile a guide groove 10b to be guided by the pair of guide pins 12 is formed at the center of the bottom surface of the upper flange 10 in such a manner as to pass through the center point of the aforementioned fit opening 10a. A screw insert slit 10c elongated in the longitudinal direction of the groove 10b is formed in the guide groove 10b for permitting insertion of a screw 15, and a tilt adjust slit 10d is formed in a manner to be elongated orthogonally to the guide groove 10b.

The upper flange 10 is so disposed as to abut against the upper surface of the mount member 8 and is attached fixedly thereto by means of a screw 15 inserted through the aforementioned slit 10c into the screw hole 13. The pair of guide pins 12 are fitted into the guide groove 10b so that the upper flange 10 can be slid along the guide groove 10b.

The tilt of the guide member 2 is slightly adjustable to the mount member 8 by first loosening the mount screw 15, then sliding the upper flange 10 in the longitudinal direction of the guide groove 10b along the pair of guide pins 12, subsequently fitting the tilt adjust pin 16 via the slit 10d into the tilt adjust hole 14, and tightening the mount screw 15 again.

Lower steps 8b are formed around the two lateral surfaces of the aforementioned element housing portion 8a, and a rotation preventive plate 17 is secured to the steps 8b by means of screws. Such plate 17 serves to prevent a rotary displacement of the laminated piezoelectric element 3 together with the guide member 2.

As illustrated in FIGS. 1 and 3, a base attach hole 19 is formed in the lower surface or anchor portion of the mount member 8 for attaching a base 18 thereto, and a pin insert hole 20 is also formed therein. The tape guide device 1 is attached firmly to the base 18 by the guide mount screw 21 inserted into the base mount hole 19 through the base 18. And the rotation preventive pin fixed in the base 18 is inserted into the pin insert hole 20 so as to prevent a rotary displacement of the tape guide device 1.

Now the function of the first embodiment will be described below with reference to FIGS. 1 and 4 through 6.

Figure 4:
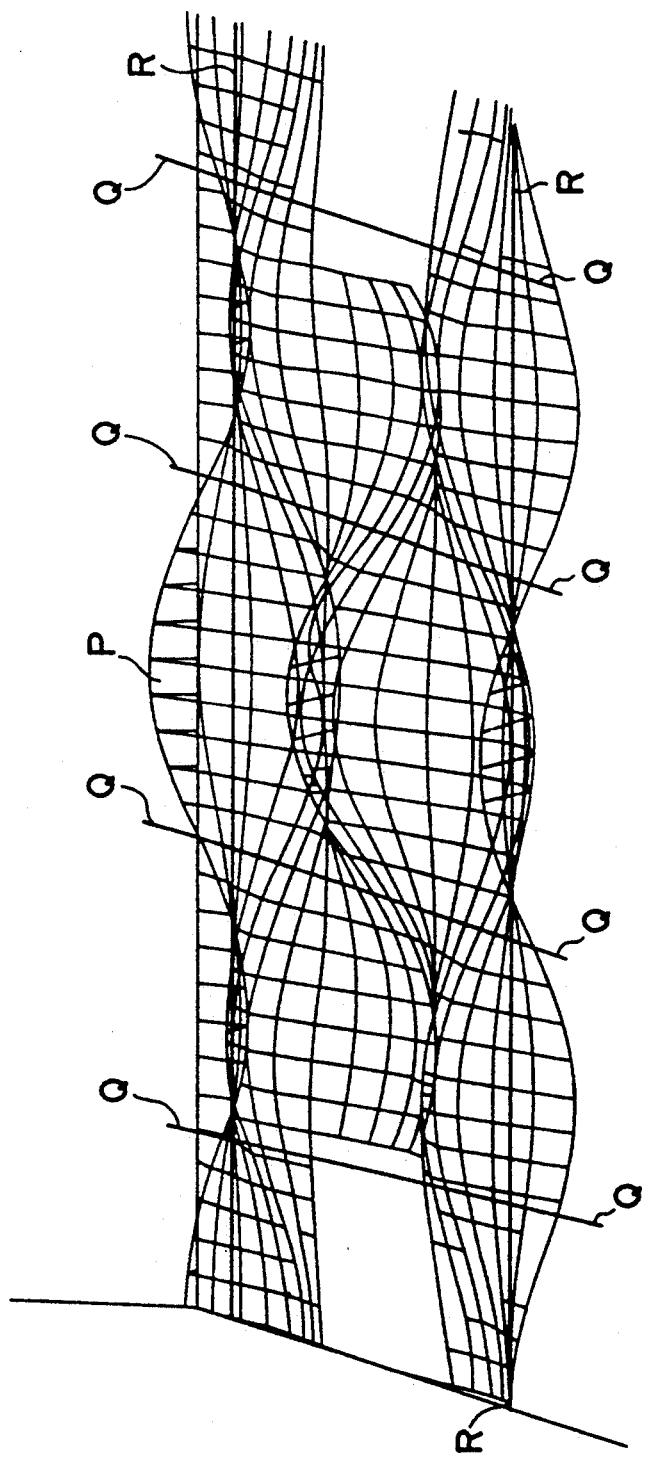

FIG. 4 illustrates a state where the standing-wave vibration generated in the guide member 2 by applying an alternating voltage to the laminated piezoelectric element is developed in the circumferential direction as denoted by a two-dot chained line in FIG. 2. FIG. 5 is a function explanatory diagram illustrating the vibration at the end face of the guide member 2. And FIG. 6 is a function explanatory diagram illustrating the vibration of the guide member 2 taken along the line VI—VI in FIG. 2 with the laminated piezoelectric element 3 ignored.

As illustrated in FIGS. 4 through 6, standing waves generated in the guide member 2 have an extremely simple and orderly waveform without including unrequired vibration component in any region except the portion where the laminated piezoelectric element 3 is bonded. This results from the improved structure inclusive of the guide member 2 shaped into a simplified pipe, wherein the laminated piezoelectric element 3 with its other end kept free is bonded to the peripheral surface of such guide member 2, and the vibrational nodes R of the guide member 2 are held by the support member 4, hence eliminating the harmful influence that may otherwise be exerted on the resonance frequency due to vibration of some external member, thermal expansion of the laminated piezoelectric element 3 or the complicated shape thereof. Consequently, it becomes possible to derive the resonance characteristic of the guide member 2 with facility.

Thus the standing waves in the guide member 2 come to have an orderly waveform without including any unrequired vibration component, hence achieving stable ultrasonic vibration. Therefore, due to the pumping action of air molecules in a gap of 3 to 30 angstroms between the contact surfaces of the tape and the guide member 2, it becomes possible to sufficiently diminish the frictional force that results from agglutination caused by the intermolecular attraction between the tape and the guide member 2 and also from thrust and upturn of the irregularities on the contact surfaces, hence attaining uniform reduction of the frictional force to stabilize the motion of the tape.

Furthermore, the guide member 2 requiring high precision in its component parts can be manufactured with ease due to its simplified structure, and there is attainable another advantage of a great mechanical strength because of the arrangement where the guide member 2 is held by the support shaft 7. In addition, the heat generated during the operation of the laminated piezoelectric element 3 is radiated both directly and through the support shaft 7 from the guide member 2 to thereby realize efficient thermal radiation.

Hereinafter a second embodiment of the present invention will be described with reference to FIGS. 7 and 8.

This embodiment represents a type attached to a shaft fixed on a base 18, and its constitution is substantially the same as that of the first embodiment except the structure of a support member 4.

Figure 7:
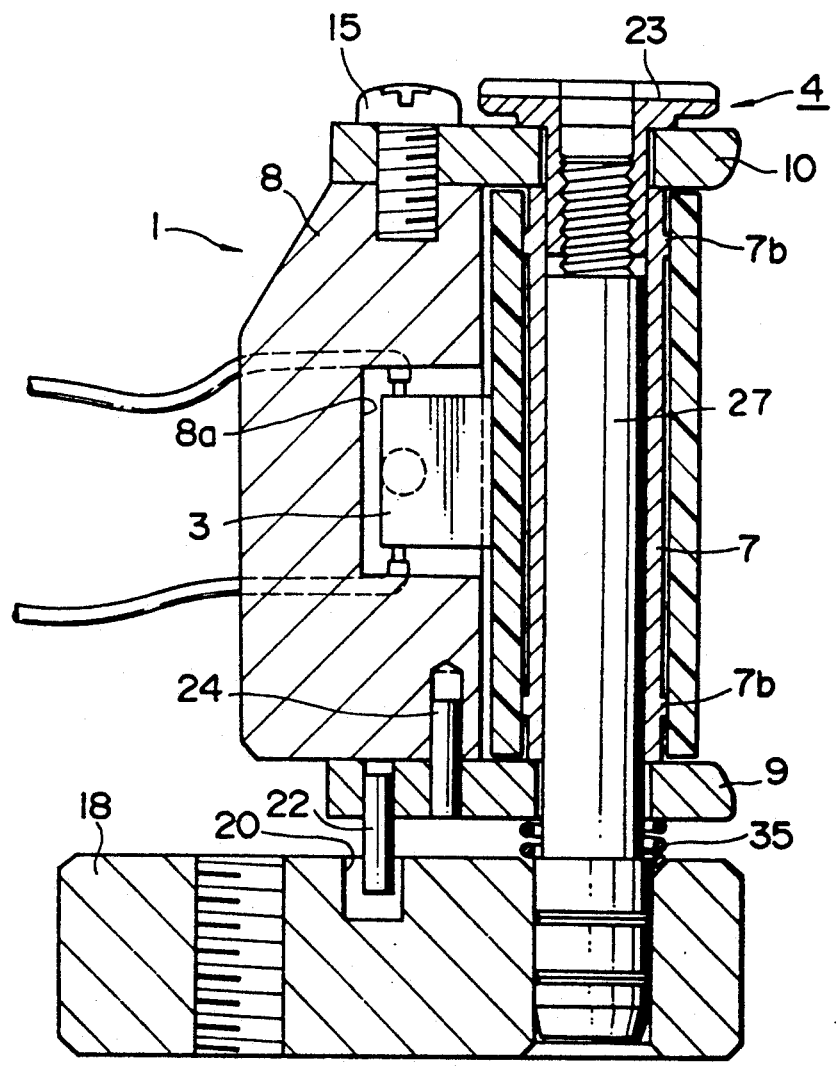
Figure 8:
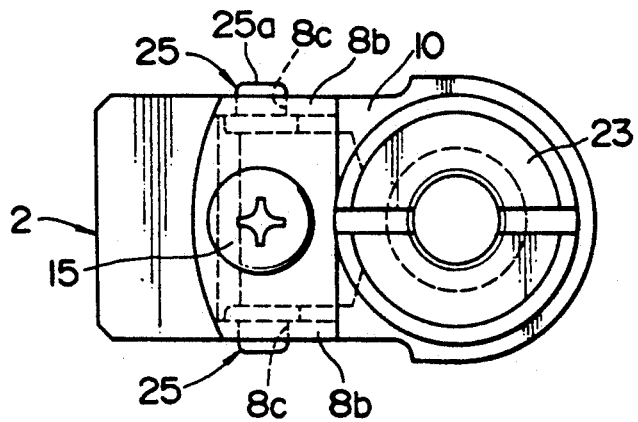

In FIGS. 7 and 8, the support member 4 is provided with a shaft member 27 inserted into a cylindrical support shaft 7. The shaft member 27 is fixed upright in a base 18 and serves to hold the entirety of the mount member. The shaft member 27 is inserted into an upper flange 10 and a lower flange 9 in a manner to push the mount member upward by means of a coiled spring 35 interposed between the lower flange 9 and the base 18. A threaded portion is formed in the shaft member 27 on one side thereof proximate to the upper flange 10, and a nut member 23 is screwed to such threaded portion so as to positionally control the mount member 8 which is pushed upward by the coiled spring 35. As a result, the height of the guide member 2 is adjusted by the nut member 23. And the mount member 8 is positioned on a lateral portion of the guide member 2 to which a laminated piezoelectric element 3 is bonded. The upper and lower ends of the mount member 8 are held respectively by the upper and lower flanges, and the top surface of the mount member 8 is secured firmly to the upper flange 10 by means of a screw 15. Meanwhile the bottom surface thereof is anchored by a pin 24 infixed in the lower flange 9.

A pin insert hole 20 is formed in the base 18, and a rotation preventive pin 22 fixed in the bottom surface of the lower flange 9 is inserted into the hole 20. This hole has a clearance in the radial direction of the support shaft 7 so as to facilitate adjustment of the height.

An element housing portion 8a in the mount member 8 is provided by forming a rectangular recess while leaving both side walls 8b unremoved, and stopper fit holes 8c are formed in the two side walls 8b. Lock projections 25a of disc-shaped stoppers 25 composed of rubber are fitted into such stopper fit holes 8c, and both sides of the laminated piezoelectric element 3 are fixed by the stoppers 25 to prevent rotation of the guide member 2.

Since any other components are substantially the same as those of the aforementioned first embodiment, a repeated explanation thereof is omitted here.

Now the function of the second embodiment will be described below.

In FIGS. 7 and 8, the second embodiment accomplishes substantially the same effects as those by the first embodiment and, in addition, the height of the guide member 2 can be adjusted by or against the restoring force of the coiled spring 35 while turning the height adjust screw.

Figure 9:
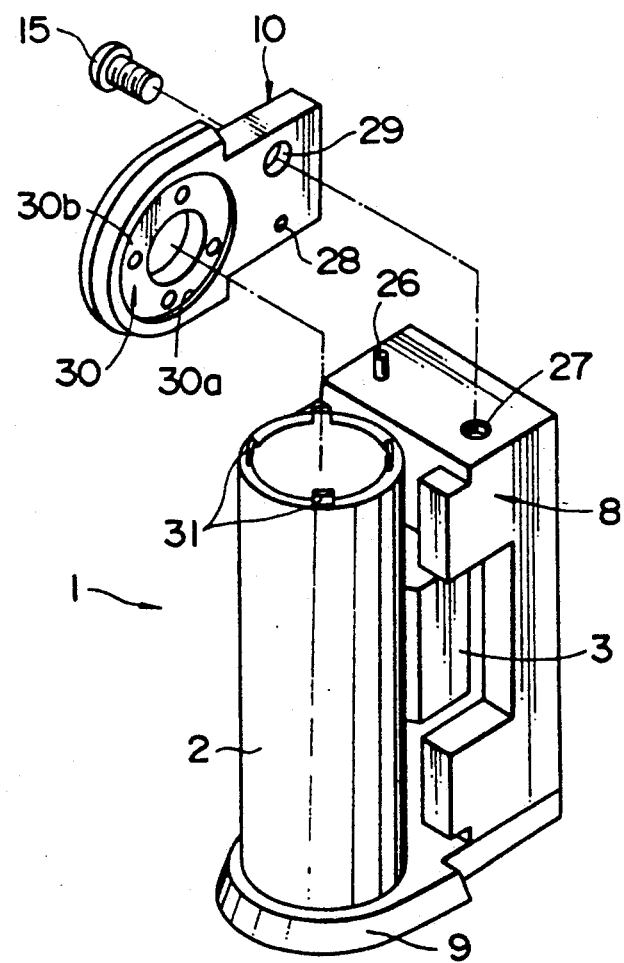
FIG. 9 is an exploded perspective view showing a third embodiment of the tape guide device.

Referring next to FIG. 9, a third embodiment of the present invention will be described.

The third embodiment is also substantially the same in constitution as the foregoing first embodiment with the exception that, when a guide member 2 is vibrated by standing waves generated from a laminated piezoelectric element 3, vibrational nodes Q induced at the end of the guide member 2 are directly supported, as illustrated in FIG. 5, by upper and lower flanges 9, 10 instead of using the aforementioned support shaft 7.

More specifically, a lower flange 9 is formed integrally with the lower end of the mount member 8. A pin 26 is fixed upright on the upper end face of the mount member 8, and a screw hole 27 is formed therein. Meanwhile a metallic upper flange 10 is so formed as to abut against the upper end face of the mount member 8. A pin fit hole 28 and a screw insert hole 29 are formed in the upper flange 10, and a pin 26 is fitted into the fit hole 28 while a mount screw 15 is inserted through the insert hole 29 into the screw hole 27, thereby securing the upper flange 10 firmly to the mount member 8.

Circular fit recesses 30 are formed in the upper and lower flanges 9, 10 on the side opposite to the guide member 2. Meanwhile rectangular lock projections 31 are formed integrally with both end faces of the guide member 2 at positions coincident with vibrational nodes Q (four in this embodiment) of the guide member 2 generated when the guide member 2 is vibrated by standing waves. (Such nodes at four positions correspond to the four nodes Q generated on the end face shown in FIG. 4.)

The four lock projections 31 are shaped to be slightly longer than the depth of the fit recesses 30 and are retained in contact, at the lateral portions thereof, with peripheral walls 30a of the fit recesses 30 to thereby prevent a circumferential rotary displacement, while the upper and lower ends of such four projections 31 are retained in contact with floors 10b of the fit recesses 30 in a state where an adequate gap is kept therebetween.

The laminated piezoelectric element is substantially the same in structure as the one employed in the first embodiment. However, since the guide member 2 in this embodiment is never rotated in its circumferential direction, there exists no necessity of providing a rotation preventive member for the laminated piezoelectric element.

The third embodiment accomplishes substantially the same effects as those by the aforementioned first embodiment with the exception that the lock projections 31 are formed, without using the aforementioned support shaft 7, at the positions of vibrational nodes generated on the end face of the guide member 2, and such projections 31 are held by the upper and lower flanges 9, 10 so that the structure can further be simplified with a reduction in both the number of required component parts and the number of assembling steps and also a curtailment of the production cost.

Figure 10:
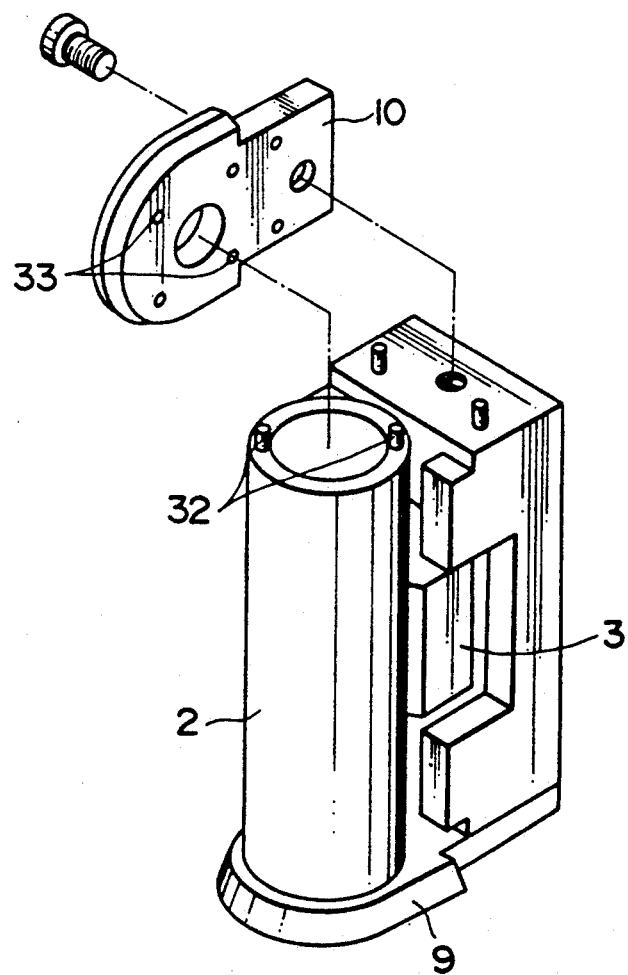
FIG. 10 is an exploded perspective view showing a fourth embodiment of the tape guide device.
Figure 11:
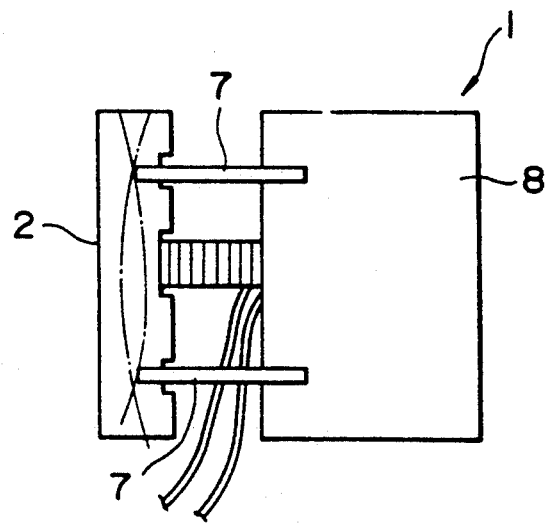
FIG. 11 is a sectional view of a conventional example.
Figure 12:
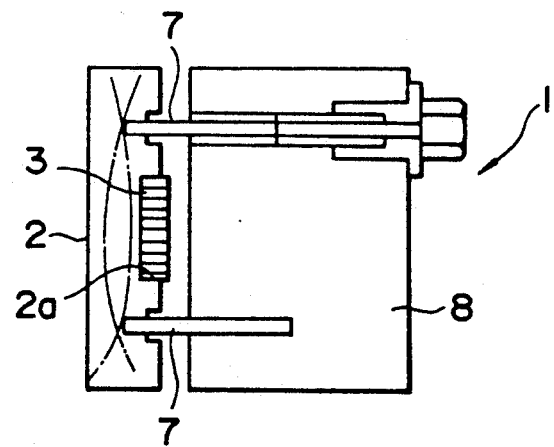
FIG. 12 is a sectional view of another conventional example.

Hereinafter a fourth embodiment of the present invention will be described with reference to FIG. 10.

This embodiment is substantially the same in constitution as the foregoing third embodiment with the exception that, as illustrated in FIG. 5, fit pins 32 (two in this embodiment) are infixed at the positions of vibrational nodes Q on the end face of the guide member 2, and fit holes 33 for receiving the pins 32 are formed in the upper and lower flanges 9, 10. The fit pins 32 are shaped to be longer than the holes 33 so that the upper and lower flanges 9, 10 are kept away from contact with vibrational loops P of the guide member 2, hence protecting the guide member 2 from harmful influence of any other member.

In this embodiment also, the pins 32 are fitted into the corresponding holes 33 to support the guide member 2, whereby such support structure is rendered capable of preventing a rotary displacement of the laminated piezoelectric element 3 with certainty.

As described hereinabove, a guide member is formed into a simplified shape, and an ultrasonic vibrator kept free at its other end is attached fixedly to a vibrational loop on the peripheral surface of the guide member, while vibrational nodes of the guide member are held by a support member. Therefore the frequency characteristics of the guide member can be simplified, and it becomes possible to eliminate concomitant vibration of other members and harmful influence resulting from thermal expansion of the ultrasonic vibrator, thereby realizing facilitated control of the resonance frequency to the ultrasonic vibrator. Thus, the vibration efficiency of the guide member to the driving power can be enhanced with another advantage that vibration by standing waves of an orderly waveform is generated uniformly throughout the entire surface of the guide member in contact with a tape. Consequently the friction between the guide member and the tape can further be reduced to eventually stabilize the motion of the tape.

What is claimed is:

1. A tape guide device for guiding a moving tape in a predetermined state with reduction of the friction between the tape and a guide member by generating standing-wave vibration in the guide member, the tape guide device comprising:

guide means shaped into a pipe and serving to guide the moving tape in a predetermined state while retaining the tape in sliding contact with the peripheral surface thereof;

freestanding vibratory means having first and second spaced-apart end portions, the first end portion being unrestrained and the second end portion being shaped with a concave curve corresponding to a peripheral surface of said guide means and attached fixedly to the center of a vibrational loop (P) on the peripheral surface of said guide means, so as to induce standing-wave vibration defining a plurality of nodes in said guide means; and support means for holding said guide means at said nodes and leaving said guide means elsewhere free to vibrate.

2. A tape guide device according to claim 1, wherein said vibratory means is bonded to the center of the vibrational loop.

3. A tape guide device according to claim 1, wherein said vibratory means is formed with cut regions to reduce the area of the surface attached fixedly to said guide means.

4. A tape guide device according to claim 1, wherein said support means comprises a support shaft inserted into said guide means so as to hold the same from inside, and a mount member having flanges to hold said support shaft at opposite ends of said guide means.

5. A tape guide device according to claim 4, wherein said mount member has a vibrator housing portion for preventing a rotary displacement of said guide means by loosely retaining said vibratory means therein.

6. A tape guide device according to claim 4, wherein said support shaft is shaped to be cylindrical, further comprising a shaft member fixed upright in the base and inserted into said support shaft in such a manner that said mount member is held by said shaft member.

7. A tape guide device according to claim 6, further comprising a coiled spring interposed between said base and said mount member through said shaft member, and a limit member for limiting axial movement of said mount member toward said support shaft, said limit member being mounted at one end of said shaft member on a side thereof away from said base.

8. A tape guide device according to claim 7, further comprising a lock member mounted between said base and the opposed surface of said mount member for preventing a rotary displacement of said mount member.

9. A tape guide device according to claim 4, wherein said guide member is formed at the opposite ends with a plurality of projections at the vibrational nodes, and said flanges are formed with recesses for accommodating said projections so that a rotary displacement of said guide member is prevented when said projections are fitted into said recesses.

10. A tape guide device for guiding a moving tape in a predetermined state with reduction of the friction between the tape and a guide member by generating standing-wave vibration in the guide member, the tape guide device comprising:

guide means shaped into a pipe and serving to guide the moving tape in a predetermined state while retaining the tape in sliding contact with the peripheral surface thereof;

vibratory means having first and second spaced-apart end portions, the first end portion being kept free and the second end portion being attached fixedly to a vibrational loop on the peripheral surface of said guide means, so as to induce standing-wave vibration defining a plurality of nodes in said guide means; and support means for holding said guide means at said nodes;

wherein said support means comprises a support shaft inserted into said guide means so as to hold the same from inside, and a mount member having flanges to hold said support shaft at opposite ends of said guide means; 'wherein said mount member has a vibrational housing portion for preventing a rotary displacement of said guide means by loosely retaining said vibratory means therein; and further comprising washer members for holding the vibrational nodes at opposite ends of said guide means, the washer members being mounted in the flanges of said mount member.

11. A tape guide device according to claim 10, wherein said mount member comprises an anchor portion adapted to be anchored to a base.

* * * * *

UNITED STATES PATENT AND TRADEMARK OFFICE
CERTIFICATE OF CORRECTION

PATENT NO. : 5,295,618
DATED : March 22, 1994
INVENTOR(S) : Etsuro Saito

It is certified that error appears in the above-indentified patent and that said Letters Patent is hereby corrected as shown below:

Col. 3, line 21, after "IV-IV" insert --of Fig. 2--

Col. 10, line 25, "wherein" should start a new line
      line 26, change "vibrational" to --vibrator--

Signed and Sealed this

Second Day of January, 1996

Attest:

BRUCE LEHMAN

Attesting Officer     Commissioner of Patents and Trademarks